United States Patent
Fei

(10) Patent No.: US 10,033,486 B2
(45) Date of Patent: Jul. 24, 2018

(54) METHOD FOR TRANSMITTING HARQ INFORMATION, BASE STATION, TERMINAL AND SYSTEM

(71) Applicant: ZTE Corporation, Shenzhen, Guangdong (CN)

(72) Inventor: Peiyan Fei, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 165 days.

(21) Appl. No.: 14/891,077

(22) PCT Filed: Dec. 31, 2013

(86) PCT No.: PCT/CN2013/091117
§ 371 (c)(1),
(2) Date: Nov. 13, 2015

(87) PCT Pub. No.: WO2014/187141
PCT Pub. Date: Nov. 27, 2014

(65) Prior Publication Data
US 2016/0087761 A1    Mar. 24, 2016

(30) Foreign Application Priority Data

May 21, 2013 (CN) .......................... 2013 1 0189943

(51) Int. Cl.
*H04W 4/00* (2018.01)
*H04L 1/18* (2006.01)
(Continued)

(52) U.S. Cl.
CPC ......... *H04L 1/1812* (2013.01); *H04B 7/0619* (2013.01); *H04L 1/1657* (2013.01);
(Continued)

(58) Field of Classification Search
CPC ........... H04W 52/221; H04W 52/0212; H04W 72/042; H04L 5/0055; H04L 5/0053; H04L 5/001; H04L 5/0037; H04L 5/0094
See application file for complete search history.

(56) References Cited

U.S. PATENT DOCUMENTS 9,059,849 B2 *  6/2015  Li .......................... H04L 1/1822
9,246,653 B2 *  1/2016  Son ......................... H04L 5/001
(Continued)

FOREIGN PATENT DOCUMENTS

| CN | 101465720 A | 6/2009 |
| CN | 102396176 A | 3/2012 |

(Continued)

OTHER PUBLICATIONS

International Search Report in international application No. PCT/CN2013/091117, dated Mar. 27, 2014, 2 pgs.
(Continued)

*Primary Examiner* — Hanh N Nguyen
(74) *Attorney, Agent, or Firm* — Cooper Legal Group, LLC

(57) ABSTRACT

Disclosed are a method and a device for transmitting HARQ information, relating to the technical field of wireless communications. The method includes that: a base station receives uplink data of a user equipment (UE), and obtains hybrid automatic repeat request (HARQ) information of the uplink data; by using the HARQ information and related information used for transmitting downlink control information, a control channel resource position corresponding to the HARQ information is determined; and by using the control channel resources indicated by the control channel resource position, the downlink control information is transmitted to the UE so that the UE acquires the HARQ information.

13 Claims, 3 Drawing Sheets

(51) Int. Cl.
*H04B 7/06* (2006.01)
*H04W 72/04* (2009.01)
*H04L 1/16* (2006.01)
*H04L 5/00* (2006.01)

(52) U.S. Cl.
CPC .......... *H04L 1/1671* (2013.01); *H04L 1/1861* (2013.01); *H04L 5/0053* (2013.01); *H04W 72/0413* (2013.01)

(56) References Cited

U.S. PATENT DOCUMENTS

| | | | |
|---|---|---|---|
| 9,538,502 B2* | 1/2017 | Chen | H04L 5/0053 |
| 9,549,416 B2* | 1/2017 | She | H04L 1/1829 |
| 2012/0026935 A1 | 2/2012 | Park | |
| 2013/0176929 A1 | 7/2013 | Yang | |
| 2014/0003356 A1* | 1/2014 | Wang | H04W 72/1289 |
| | | | 370/329 |
| 2014/0192757 A1 | 7/2014 | Lee | |
| 2014/0348091 A1 | 11/2014 | Seo et al. | |

FOREIGN PATENT DOCUMENTS

| | | |
|---|---|---|
| CN | 103002582 A | 3/2013 |
| CN | 103109487 A | 5/2013 |
| JP | 2013524614 A | 6/2013 |
| WO | 2008114510 A1 | 9/2008 |
| WO | 2013025005 A2 | 2/2013 |
| WO | 2013066086 A1 | 5/2013 |

OTHER PUBLICATIONS

English Translation of the Written Opinion of the International Search Authority in international application No. PCT/CN2013/091117, dated Mar. 27, 2014, 11 pgs.
"On HARQ procedure for non-ideal backhaul", May 2013, ZTE, 3GPP TSG-RAN WG1#73 R1-132085, 3 pgs.
Supplementary European Search Report in European application No. 13885226.4, dated Jun. 1, 2016, 9 pgs.

* cited by examiner

METHOD FOR TRANSMITTING HARQ INFORMATION, BASE STATION, TERMINAL AND SYSTEM

TECHNICAL FIELD

The present disclosure relates to Hybrid Automatic Repeat Request (HARQ) information feedback technology in the technical field of wireless communications, and in particular to a method for transmitting HARQ information, a base station, a terminal and a system.

BACKGROUND

With the rapid development of Long Term Evolution (LTE) systems, there are increasing new techniques in LTE-Advanced systems. Compared to the LTE systems, LTE-Advanced systems have been enhanced in terms of critical technologies by continuous introduction of Carrier Aggregation (CA) technology, Relay technology, Coordinated Multiple Point (CoMP) technology, enhanced multi-antenna technology, uplink multi-antenna technology and the like.

With the introduction of new technologies such as the CA technology, the number of users that can be served by a system is increasing, and thus there may be a problem of insufficient control channel resources. In the existing CA technology, it is specified that downlink carriers of Physical Hybrid ARQ Indicator Channel (PHICH) resources are consistent with downlink carriers of their corresponding authorization information. In this way, in the case of intersected carrier scheduling, there may be a problem of further insufficient control channel resources.

Since PHICH resources are limited in an LTE system, a greatly increasing number of users may cause transmission of HARQ information of uplink data of users to be limited, thus resulting in inability of transmitting HARQ information of the uplink data.

In addition, in the LTE system, transmission of control information is required to be combined with transmission of Cell-specific Reference Signals (CRS) so that demodulation of the control channel is performed. However, no transmission of CRS information in the New Carrier Type (NCT) results in inability of transmitting PHICH resources in the LTE system, thereby leading to a problem regarding transmission of HARQ information of uplink data.

SUMMARY

To solve the above technical problems in the prior art, embodiments of the disclosure provide a method and a system for transmitting HARQ information, a base station, a terminal.

According to an aspect of the disclosure, provided is a method for transmitting HARQ information including:

a base station receives uplink data of a UE, and obtains HARQ information of the uplink data;

a control channel resource position corresponding to the HARQ information is determined by using the HARQ information and related information for transmitting downlink control information; and the downlink control information is transmitted to the UE by using resources of a control channel indicated by the control channel resource position so that the UE acquires the HARQ information.

In an embodiment, the step that a base station receives uplink data of a UE and obtains HARQ information of the uplink data may include: the base station obtains the HARQ information of the uplink data by performing reception processing on the uplink data, wherein the HARQ information includes an ACK/NACK value for indicating a result of the reception processing on the uplink data.

In an embodiment, when the control channel is a Physical Downlink Control Channel (PDCCH), the related information for transmitting the downlink control information includes an aggregation level and a Carrier Indicator Field (CIF) indication value; and the step that a control channel resource position corresponding to the HARQ information is determined by using the HARQ information and related information for transmitting downlink control information may include: the base station determines a PDCCH resource position of the UE corresponding to the ACK/NACK value by using the ACK/NACK value, the aggregation level and the CIF indication value.

In an embodiment, when the control channel is an Enhanced Physical Downlink Control Channel (EPDCCH), the related information for transmitting the downlink control information includes the number of allocated Physical Resource Blocks (PRBs) in a PRB set of the EPDCCH, an aggregation level and a CIF indication value; and the base station determines an EPDCCH resource position of the UE corresponding to the ACK/NACK value by using the ACK/NACK value, the number of allocated PRBs, the aggregation level and the CIF indication value.

In an embodiment, the step that the UE acquires the HARQ information may include:

the UE receives the downlink control information from the base station through the control channel;

the UE determines whether there is HARQ information transmitted by using information of a current sub-frame for transmitting the downlink control information; and if it is determined that there is HARQ information transmitted, the HARQ information is obtained by determination of a control channel resource position used by the downlink control information.

In an embodiment, the step of determining the control channel resource position may include: when the control channel is a PDCCH, the UE determines the PDCCH resource position of the UE by using related information for receiving the downlink control information, which contains the aggregation level and the CIF indication value, through traversal of the ACK/NACK value of the uplink data.

In an embodiment, the step of determining the control channel resource position may include: when the control channel is an EPDCCH, the UE determines the EPDCCH resource position of the UE by using related information for receiving the downlink control information, which contains the number of allocated PRBs, the aggregation level and the CIF indication value, through traversal of the ACK/NACK value of the uplink data.

In an embodiment, the method may further include:

the UE finds PDCCH resources or EPDCCH resources via the PDCCH resource position or the EPDCCH resource position, and demodulates the downlink control information of the UE by using the PDCCH resources or the EPDCCH resources.

According to another aspect of the disclosure, provided is a base station including:

an HARQ information acquisition module configured to receive uplink data of a UE and obtain HARQ information of the uplink data;

a position determination module configured to determine, by using the HARQ information and related information for transmitting downlink control information, a control channel resource position corresponding to the HARQ information; and an information transmitting module configured to transmit, by using resources of a control channel indicated by the control channel resource position, the downlink control information to the UE so that the UE acquires the HARQ information.

According to another aspect of the disclosure, provided is a terminal including:

an information reception module configured to receive downlink control information from a base station through a control channel;

an HARQ information determination module configured to, by using information of a current sub-frame for transmitting the downlink control information, determine whether there is HARQ information transmitted; and an HARQ information acquisition module configured to, when it is determined that there is HARQ information transmitted, obtain the HARQ information by determining a control channel resource position used by the downlink control information.

In an embodiment, the terminal may further include:

an information demodulation module configured to find resources of the control channel via the control channel resource position, and demodulate the downlink control information of the UE by using the resources of the control channel, wherein the control channel is a PDCCH or an EPDCCH.

According to another aspect of the disclosure, provided is a system for transmitting HARQ information including the aforementioned base station and the aforementioned terminal.

According to another aspect of the disclosure, provided is a computer readable storage medium, comprising a set of instructions, when executed, to cause at least one processor to perform the following operations that:

a base station receives uplink data of a UE, and obtains HARQ information of the uplink data;

a control channel resource position corresponding to the HARQ information is determined using the HARQ information and related information for transmitting downlink control information; and the downlink control information is transmitted to the UE by using resources of a control channel indicated by the control channel resource position so that the UE acquires the HARQ information.

Compared to the prior art, the embodiments of the disclosure have the following beneficial effects:

According to the embodiments of the disclosure, the HARQ information is combined with allocation of PDCCH/EPDCCH resource positions. The HARQ information is transmitted implicitly to a UE via the PDCCH/EPDCCH resource positions of the UE. In this way, without influences on the number of resources occupied by the PDCCH/EPDCCH, both the HARQ information and PDCCH/EPDCCH information are transmitted while time frequency resources are saved.

DETAILED DESCRIPTION

Preferred embodiments of the disclosure will be elaborated below with reference to accompanying drawings, and it should be appreciated that preferred embodiments described below are only used to describe and explain the disclosure instead of limiting the same.

The embodiments of the disclosure provide an effective method of combining allocation of PDCCH resource positions with HARQ information and an effective method of combining allocation of EPDCCH resource position and HARQ information so as to solve existing problems in the prior art.

Figure 1:
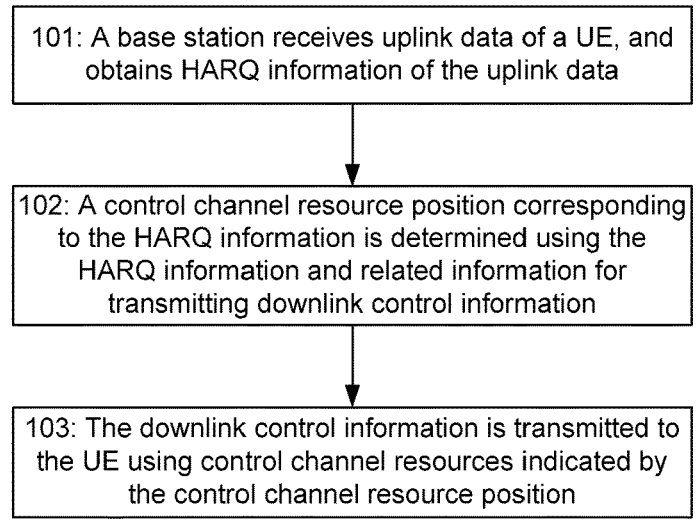
FIG. 1 is a block diagram illustrating principle of a method for transmitting HARQ information according to an embodiment of the disclosure.

FIG. 1 is a block diagram illustrating principle of a method for transmitting HARQ information according to an embodiment of the disclosure. As shown in FIG. 1, the method includes the following steps.

Step 101, a base station receives uplink data of a UE, and obtains HARQ information of the uplink data by performing reception processing on the uplink data.

Herein the HARQ information includes an ACK/NACK value indicating a result of the reception processing on the uplink data.

Step 102, a control channel resource position corresponding to the HARQ information is determined by using the HARQ information and related information for transmitting downlink control information.

Specifically, when the control channel is a PDCCH, the related information for transmitting the downlink control information includes an aggregation level and a Carrier Indicator Field (CIF) indication value. The base station side determines a PDCCH resource position of the UE corresponding to the ACK/NACK value by using the ACK/NACK value, the aggregation level and the CIF indication value. When the control channel is an EPDCCH, the related information for transmitting the downlink control information includes the number of allocated PRBs in a PRB set of the EPDCCH, an aggregation level and a CIF indication value. The base station side determines an EPDCCH resource position of the UE corresponding to the ACK/NACK value by using the ACK/NACK value, the number of allocated PRBs, the aggregation level and the CIF indication value.

Step 103, the downlink control information is transmitted to the UE by using resources of a control channel indicated by the control channel resource position so that the UE acquires the HARQ information.

Herein, the step that the UE acquires the HARQ information includes that: the UE receives the downlink control information from the base station through the control channel; the UE determines, by using information of a current sub-frame for transmitting the downlink control information, whether there is HARQ information transmitted; and if it is determined that there is HARQ information transmitted, the HARQ information is obtained through determination of a control channel resource position used by the downlink control information.

Herein, the step of determining the control channel resource position may include that: when the control channel is a PDCCH, the UE determines the PDCCH resource position of the UE by using related information for receiving the downlink control information, which contains the aggregation level and the CIF indication value, through traversal of the ACK/NACK value of the uplink data; when the control channel is an EPDCCH, the UE determines the EPDCCH resource position of the UE by using related information for receiving the downlink control information, which contains the number of allocated PRBs, the aggregation level and the CIF indication value, through traversal of the ACK/NACK value of the uplink data.

Preferably, the UE may find PDCCH resources or EPDCCH resources through the PDCCH resource position or the EPDCCH resource position, respectively, and demodulate the downlink control information of the UE by using the PDCCH resources or the EPDCCH resources.

Figure 2:
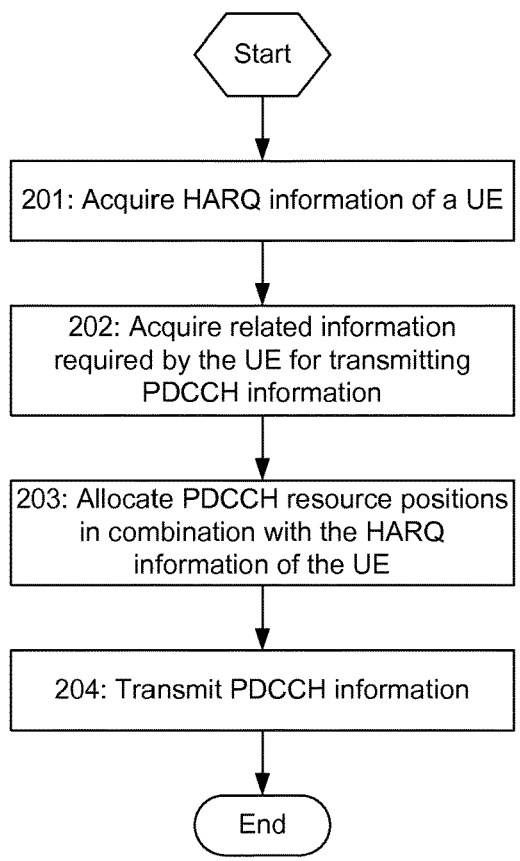
FIG. 2 is a flow chart illustrating combination of HARQ information of uplink data with allocation of PDCCH resource positions according to an embodiment of the disclosure.

FIG. 2 is a flow chart illustrating combination of HARQ information of uplink data with allocation of PDCCH resource positions according to an embodiment of the disclosure. As shown in FIG. 2, the following steps are included.

Step 201, a base station receives uplink data from a UE, and obtains HARQ information of the uplink data through reception processing.

Step 202, the base station acquires related information with respect to the UE required for transmitting PDCCH information (i.e., transmitting Downlink Control Information (DCI) through a PDCCH), such as an aggregation level L, a CIF indication value nCI and the like. The PDCCH information herein can carry uplink authorization information of the UE and can also carry downlink authorization information of the UE.

Step 203, the base station allocates PDCCH resource positions in combination with the HARQ information of the UE. In other words, the base station side enables combination of the HARQ information into allocation of the PDCCH resource positions of the UE so that allocated PDCCH resource positions of the UE reflect whether there is HARQ information transmitted at the base station side, and specific HARQ information transmitted.

The combination of the HARQ information with the corresponding PDCCH resource position of the UE is performed through the following formula (1):

$$L\{(Y_k+m'+f(ack1,ack2,ack3,\ldots))\bmod \lfloor N_{CCE,k}/L\rfloor\}+i \quad (1)$$

Herein, the function f(ack1,ack2,ack3, ... ) is a function of variables ack1, ack2, ack3 .... One expression of f is provided herein as:

$$f(ack1,ack2,ack3,\ldots)=K_1\cdot(M1\cdot ack1+1)+K_2\cdot(M2\cdot ack2+1)+K_3\cdot(M3ack3+1)+\ldots \quad (2)$$

Then, formula (1) may be expressed as the following formula (3):

$$L\{(Y_k+m'+K_1\cdot(M1\cdot ack1+1)+K_2\cdot(M2ack2+1)+K_3\cdot(M3ack3+1)+\ldots)\bmod \lfloor N_{CCE,k}/L\rfloor\}+i \quad (3)$$

Step 204, the base station transmits the PDCCH information to the UE.

Specifically, the base station finds PDCCH resources by determining PDCCH resource positions, and transmits, using the PDCCH resources, DCI information to the UE so that the UE obtains the HARQ information.

Steps for the UE to obtain the HARQ information, i.e., processing steps at the UE side include the following steps.

Step one, the UE receives the PDCCH information transmitted from the base station, i.e., the UE receives the DCI from the base station through the PDCCH.

Step two, the UE acquires related information required for receiving the PDCCH information, such as the aggregation level L, the CIF indication value nCI and the like.

Step three, the UE determines whether the base station transmits the HARQ information according to a current sub-frame for transmitting the downlink control information, and acquires a PDCCH resource position according to the determination.

If there is HARQ information transmitted, the PDCCH resource position is acquired by using the method according to the embodiment of the disclosure; otherwise, the PDCCH resource position is acquired according to a method for allocating PDCCH resource positions in the existing LTE technology. That is to say, the technical solution provided by the embodiment is backward-compatible.

Similar to the step for allocating HARQ information and PDCCH resource positions at the base station side, the UE calculates its PDCCH resource positions according to the following formula:

$$L\{(Y_k+m'+f(ack1,ack2,ack3,\ldots))\bmod \lfloor N_{CCE,k}/L\rfloor\}+i$$

where the expression of f remains consistent with that at the base station side.

Since the UE does not know a specific value of the HARQ information fed back by the base station, during demodulation, the UE needs to traverse all possible HARQ values so as to acquire a corresponding allocated PDCCH resource position.

Step four, the UE demodulates its PDCCH information on PDCCH resources indicated by the PDCCH resource position, i.e., obtains its DCI via the demodulation.

Each parameter in the formula is described as follows.

$$i=0,\ldots,L-1.$$

If a higher layer is configured with CIF, $m'=m+M^{(L)}\cdot n_{CI}$, where $n_{CI}$ is a value of CIF and $m=0, 1, \ldots M^{(L)}-1$; if the higher layer is not configured with CIF, $m'=m$, and $M^{(L)}$ is the number of PDCCH candidates having an aggregation level L in a search space.

$Y_k$ has a value of $Y_k=(A\cdot Y_{k-1})\bmod D$, where $Y_{-1}=n_{RNTI}\neq 0$, $A=39827$ and $D=65537$ k is a serial number of a sub-frame in a wireless frame, where $k=[n_s/2]$, $n_s$ is a code of a slot in the wireless frame, and $n_{RNTI}$ is an RNTI representing a terminal identifier configured for the UE by the higher layer.

Embodiment 1

Assuming that a terminal uploads simultaneously two data blocks in the uplink, then after performing reception processing on the two data blocks, the base station is required to transmit simultaneously two pieces of obtained HARQ information corresponding to the two data blocks, and an operation process at the base station side is as follows.

1. The base station acquires HARQ information of uplink data of the UE, i.e., ack1 and ack2 each with a value of 0 or 1.

2. The UE acquires related information required for receiving PDCCH information of the UE, such as an aggregation level L, a CIF indication value nCI and the like. The PDCCH herein can carry uplink authorization information of the UE and can also carry downlink authorization information of the UE.

3. The base station calculates allocated PDCCH resource positions of the UE according to the following formula:

$$L\{(Y_k+m'+K_1\cdot(M1\cdot ack1+1)+K_2\cdot(M2\cdot ack2+1)+K_3\cdot(M3\cdot ack3+1)+\ldots)\bmod \lfloor N_{CCE,k}/L\rfloor\}+i$$

In the embodiment, M1 of the above formula has a value of $$\left\lceil\frac{n_{CI}+3}{2}\right\rceil,$$

and M2 has a value of $$\left\lceil\frac{n_{CI}+1}{2}\right\rceil.$$

Since the base station transmits HARQ information, parameters K1 and K2 both have a value of 1. The formula for calculating PDCCH resource positions is as follows.

$$L\left\{\left(Y_k+m'+\left(\left(\left\lceil\frac{n_{CI}+3}{2}\right\rceil\cdot ack1+1\right)+\left(\left\lceil\frac{n_{CI}+1}{2}\right\rceil\cdot ack2+1\right)\right)\right)\bmod\lfloor N_{CCE,k}/L\rfloor\right\}+i$$

4. The base station transmits PDCCH information of the UE. Specifically, the base station finds PDCCH resources through determined PDCCH resource positions, and transmits, by using the PDCCH resources, DCI information to the UE so that the UE can obtain the HARQ information.

At the UE side, steps for the UE to obtain the HARQ information are as follows.

1. The UE receives PDCCH information transmitted from the base station.

2. The UE acquires related information required for receiving the PDCCH information, such as the aggregation level L, the CIF indication value nCI and the like. The PDCCH herein can carry uplink authorization information of the UE and can also carry downlink authorization information of the UE.

3. The UE calculates its PDCCH resource positions according to the following formula:

$$L\{(Y_k+m'+K_1\cdot(M1\cdot ack1+1)+K_2\cdot(M2\cdot ack2+1)+K_3\cdot(M3\cdot ack3+1)+\ldots)\bmod \lfloor N_{CCE,k}/L\rfloor\}+i$$

In the embodiment, M1 of the above formula has a value of $$\left\lceil\frac{n_{CI}+3}{2}\right\rceil,$$

and M2 has a value of $$\left\lceil\frac{n_{CI}+1}{2}\right\rceil.$$

Since there is HARQ information transmitted, parameters K1 and K2 both have a value of 1, and the formula for calculating PDCCH resource positions is as follows.

$$L\left\{\left(Y_k+m'+\left(\left(\left\lceil\frac{n_{CI}+3}{2}\right\rceil\cdot ack1+1\right)+\left(\left\lceil\frac{n_{CI}+1}{2}\right\rceil\cdot ack2+1\right)\right)\right)\bmod\lfloor N_{CCE,k}/L\rfloor\right\}+i$$

Since the UE does not know a specific value of the HARQ information fed back by the base station, during demodulation, the UE needs to traverse all possible HARQ values so as to acquire a corresponding PDCCH resource position.

4. The UE demodulates its PDCCH information on PDCCH resources indicated by the corresponding PDCCH resource position.

Each parameter in the formula is described as follows.

$i=0,\ldots,L-1$.

If a higher layer is configured with CIF, $m'=m+m^{(L)}\cdot n_{CI}$, where $n_{CI}$ is a value of CIF and $m=0, 1, \ldots M^{(L)}-1$; if the higher layer is not configured with CIF, $m'=m$ and $M^{(L)}$ is the number of PDCCH candidates having an aggregation level L in a search space.

$Y_k$ has a value $Y_k=(A\cdot Y_{k-1})\bmod D$, where $Y_{-1}=n_{RNTI}\neq 0$, A=39827 and D=65537, k is a serial number of a sub-frame in a wireless frame, where $k=[n_s/2]$, $n_s$ is a code of a slot in the wireless frame, and $n_{RNTI}$ is an RNTI representing a terminal identifier configured for the UE by the higher layer.

Embodiment 2

When a base station does not receive uplink data, there is no HARQ information transmitted. Thus, a specific operation process of the base station is as follows.

1. The base station acquires HARQ information of uplink data of a UE. Since there is no HARQ information transmitted, ACK=null.

2. The UE acquires related information required for receiving PDCCH information of the UE, such as an aggregation level L, a CIF indication value nCI, $N_{CCE}$ value and the like. The PDCCH herein can carry uplink authorization information of the UE and can also carry downlink authorization information of the UE.

3. PDCCH resource positions of the UE are calculated according to the following formula:

$$L\{(Y_k+'+K_1\cdot(M1\cdot ack1+1)+K_2\cdot(M2\cdot ack2+1)+K_3\cdot(M3\cdot ack3+1)+\ldots)\bmod \lfloor N_{CCE,k}/L\rfloor\}+i$$

In the embodiment, since there is no HARQ information transmitted, parameters K1 and K2 both have a value of 0, and the formula for calculating PDCCH resource positions is as follows.

$$L\{(Y_k+m')\bmod \lfloor N_{CCE,k}/L\rfloor\}+i$$

It can be seen from the above formula that the method for allocating PDCCH resource positions is compatible with the allocation method in the existing LTE techniques.

4. The base station side transmits PDCCH information of the UE. Specifically, the base station finds PDCCH resources through determined PDCCH resource positions, and transmits, using the PDCCH resources, DCI information to the UE so that the UE can obtain the HARQ information.

At the UE side, steps for the UE to obtain the HARQ information are as follows.

1. The UE receives corresponding PDCCH information transmitted from the base station.

2. The UE acquires related information required for receiving the PDCCH information, such as the aggregation level L, the CIF indication value nCI and the like. The PDCCH herein can carry uplink authorization information of the UE and can also carry downlink authorization information of the UE.

3. The UE calculates its allocated PDCCH resource positions according to the following formula:

$$L\{(Y_k+m'+K_1\cdot(M1\cdot ack1+1)+K_2\cdot(M2\cdot ack2+1)+K_3\cdot(M3ack3+1)+\ldots)\bmod \lfloor N_{CCE,k}/L\rfloor\}+i$$

In the embodiment, since there is no HARQ information transmitted, parameters K1 and K2 both have a value of 0, and the formula for calculating PDCCH resource positions is as follows.

$$L\{(Y_k+m')\bmod \lfloor N_{CCE,k}/L\rfloor\}+i$$

4. The UE demodulates its PDCCH information on a PDCCH indicated by the corresponding allocated PDCCH resource position.

Each parameter in the formula is described as follows.

$i=0,\ldots,L-1$.

If a higher layer is configured with CIF, $m'=m+m^{(L)}\cdot n_{CI}$, where $n_{CI}$ is a value of CIF and $m=0, 1, \ldots m^{(L)}-1$; if the higher layer is not configured with CIF, $m'=m$, and $M^{(L)}$ is the number of PDCCH candidates having an aggregation level L in a search space.

$Y_k$ has a value $Y_k=(A\cdot Y_{k-1})\bmod D$, where $Y_{-1}=n_{RNTI}\neq 0$. A=39827 and D=65537, k is a serial number of a sub-frame in a wireless frame, $k=[n_s/2]$, $n_s$ is a code of a slot in the wireless frame, and $n_{RNTI}$ is an RNTI representing a terminal identifier configured for the UE by the higher layer.

Figure 3:
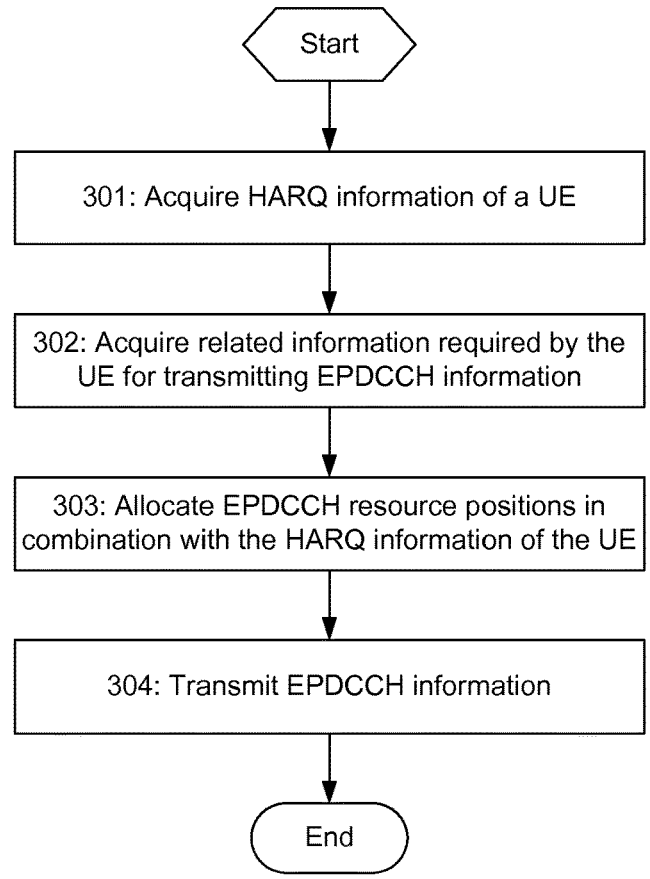
FIG. 3 is a flow chart illustrating combination of HARQ information of uplink data and allocation of EPDCCH resource positions according to an embodiment of the disclosure.

FIG. 3 is a flow chart illustrating combination of HARQ information of uplink data and allocation of EPDCCH resource positions according to an embodiment of the disclosure. As shown in FIG. 3, the following steps are included.

Step 301, a base station receives uplink data from a UE, and obtains HARQ information of the uplink data through reception processing.

Step 302, the base station acquires related information with respect to the UE required for transmitting EPDCCH information (i.e., transmitting Downlink Control Information (DCI) through an EPDCCH), such as the number of allocated PRBs of an EPDCCH-PRB-set, an aggregation level L, a CIF indication value nCI and the like. The EPDCCH herein can carry uplink authorization information of the UE and can also carry downlink authorization information of the UE.

Step 303, the base station allocates EPDCCH resource positions in combination with the HARQ information of the UE. In other words, the base station enables combination of the HARQ information into allocation of the EPDCCH resource positions of the UE so that allocated EPDCCH resource positions of the UE reflect whether there is HARQ information transmitted at the base station side, and specific HARQ information transmitted.

The combination of the HARQ information with the corresponding EPDCCH resource position of the UE is performed through formula (4):

$$L\left\{\left(Y_{p,k}+\left\lfloor\frac{m\cdot N_{ECCE,p,k}}{L\cdot M_p^{(L)}}\right\rfloor\right)+b+f(ack1,ack2,ack3,\ldots)\right\} \quad (4)$$

$$\bmod\lfloor N_{ECCE,p,k}/L\rfloor\}+i$$

Where the function $f(ack1, ack2, ack3, \ldots)$ is a function of variables ack1, ack2, ack3, ..., and one expression of f is provided herein as:

$$f(ack1,ack2,ack3,\ldots)=K_1\cdot(M1ack1+1)+K_2\cdot(M2\cdot ack2+1)+K_3\cdot(M3\cdot ack3+1)+ \quad (5)$$

Then, formula (4) can be drafted as the following formula (6):

$$L\left\{\left(Y_{p,k}+\left\lfloor\frac{m\cdot N_{ECCE,p,k}}{L\cdot M_p^{(L)}}\right\rfloor\right)+b+K_1\cdot(M1\cdot ack1+1)+ \right. \quad (6)$$
$$\left. K_2\cdot(M2\cdot ack2+1)+K_3\cdot(M3\cdot ack3+1)+\ldots\right)$$
$$\bmod\lfloor N_{ECCE,p,k}/L\rfloor\}+i$$

Step 304, the base station side transmits corresponding EPDCCH information to the UE.

Specifically, the base station finds EPDCCH resources via determined EPDCCH resource positions, and transmits, using the EPDCCH resources, DCI information to the UE so that the UE obtains the HARQ information.

Steps for the UE to obtain the HARQ information, i.e., processing steps at the UE side include:

Step 304-1, the UE receives EPDCCH information transmitted from the base station, i.e., the UE receives the DCI from the base station through the EPDCCH.

Step 304-2, the UE acquires related information required for receiving the EPDCCH information, such as the number of allocated PRBs of an EPDCCH-PRB-set, the aggregation level L, the CIF indication value nCI and the like. The EPDCCH herein can carry uplink authorization information of the UE and can also carry downlink authorization information of the UE.

Step 304-3, the UE determines whether the base station transmits HARQ information according to a current subframe for transmitting the downlink control information, and acquires EPDCCH resource positions according to the determination.

If there is HARQ information transmitted, the EPDCCH resource position is acquired using the method according to the embodiment of the disclosure; otherwise, the EPDCCH resource position is acquired according to a method for allocating EPDCCH resource positions in the existing LTE techniques. That is to say, the technical solution provided by the embodiment is backward-compatible.

Similar to the step for allocating HARQ information and EPDCCH resource positions at the base station side, the UE calculates its EPDCCH resource positions according to the following formula:

$$L\left\{\left(Y_{p,k}+\left\lfloor\frac{m\cdot N_{ECCE,p,k}}{L\cdot M_p^{(L)}}\right\rfloor\right)+b+f(ack1,ack2,ack3,\ldots)\right\}$$

$$\bmod\lfloor N_{ECCE,p,k}/L\rfloor\}+i$$

where the expression of f remains consistent with that of the base station side.

Since the UE does not know a specific value of the HARQ information fed back by the base station, during demodulation, the UE needs to traverse all possible HARQ values so as to acquire a corresponding allocated EPDCCH resource position.

Step 304-4, the UE demodulates its EPDCCH information on EPDCCH resources indicated by the EPDCCH resource position, i.e., obtains its DCI through the demodulation.

Each parameter in the formula is described as follows.

$i=0,\ldots,L-1;$ $N_{ECCE,p,k}$ is the number of ECCEs in an EPDCCH-PRB-set P, which can be acquired through table lookup;

if a higher layer is configured with CIF indication, $b=n_{CI}$; otherwise, $b=0$, where $n_{CI}$ is a value of CIF; $m=0, 1, \ldots M_p^L-1$, where $M_p^{(L)}$ is the number of EPDCCH candidates having an aggregation level L in the EPDCCH-PRB-set P.

$Y_{p,k}$ has a value $Y_{p,k}=(A \cdot Y_{p,k-1})\mod D$, where $Y_{p,-1}=n_{RNTI}\neq 0$, A=39827 and D=65537, k is a serial number of a sub-frame in a wireless frame, $k=[n_s/2]$, $n_s$ is a code of a slot in the wireless frame, and $n_{RNTI}$ is a terminal identifier configured to the UE by the higher layer.

Embodiment 3

When a system transmits HARQ information of uplink data, there may be cases where the HARQ information of the uplink data cannot be transmitted due to lack of PHICH resources. A specific embodiment is provided herein for solving such a problem. Assuming that a terminal uploads simultaneously two data blocks, then after performing reception processing on the two data blocks, the base station is required to transmit an obtained result of the reception processing, i.e., transmit simultaneously two pieces of HARQ information, and an operation process at the base station side is as follows.

1. The base station acquires uplink data of the UE, and performs reception processing on the uplink data to obtain HARQ information of the uplink data, i.e., ack1 and ack2 each with a value of 0 or 1.

2. The UE acquires EPDCCH-PRB-set information of the UE and a sub-frame serial number, determines values of p and k, and acquires related information with respect to the UE required for transmitting EPDCCH information, such as the number of allocated PRBs, an aggregation level L, a CIF indication value nCI, $N_{CCE}$ value and the like. The EPDCCH herein can carry uplink authorization information of the UE and can also carry downlink authorization information of the UE.

3. The base station calculates EPDCCH resource positions of the UE according to the following formula:

$$L\left\{\left(Y_{p,k}+\left\lfloor\frac{m\cdot N_{ECCE,p,k}}{L\cdot M_p^{(L)}}\right\rfloor\right)+b+K_1\cdot(M1\cdot ack1+1)+K_2\cdot(M2\cdot ack2+1)+K_3\cdot(M3\cdot ack3+1)+\ldots\right)\mod\lfloor N_{ECCE,p,k}/L\rfloor\right\}+i$$

In the embodiment, M1 of the above formula has a value of $$\left\lceil\frac{b+9}{2}\right\rceil,$$

and M2 has a value of $$\left\lceil\frac{b+1}{2}\right\rceil.$$

Since there is HARQ information transmitted, parameters K1 and K2 both have a value of 1. Thus, the formula for calculating EPDCCH resource positions is as follows.

$$L\left\{\left(Y_{p,k}+\left\lfloor\frac{m\cdot N_{ECCE,p,k}}{L\cdot M_p^{(L)}}\right\rfloor\right)+b+\left(\left(\left\lceil\frac{b+9}{2}\right\rceil\cdot ack1+1\right)+\left(\left\lceil\frac{b+1}{2}\right\rceil\cdot ack2+1\right)\right)\right)\mod\lfloor N_{ECCE,p,k}/L\rfloor\right\}+i$$

4. The base station transmits EPDCCH information of the UE.

Specifically, the base station finds EPDCCH resources through determined EPDCCH resource positions, and transmits, using the EPDCCH resources, DCI information to the UE for the UE to obtain HARQ information.

At the UE side, steps for the UE to obtain the HARQ information are as follows.

1. The UE receives corresponding EPDCCH information transmitted from the base station.

2. The UE acquires related information required for receiving the EPDCCH information, such as the number of allocated PRBs of an EPDCCH-PRB-set, the aggregation level L, the CIF indication value nCI and the like. The EPDCCH herein can carry uplink authorization information of the UE and can also carry downlink authorization information of the UE.

3. The UE calculates its allocated EPDCCH resource positions according to the following formula:

$$L\left\{\left(Y_{p,k}+\left\lfloor\frac{m\cdot N_{ECCE,p,k}}{L\cdot M_p^{(L)}}\right\rfloor\right)+b+K_1\cdot(M1\cdot ack1+1)+K_2\cdot(M2\cdot ack2+1)+K_3\cdot(M3\cdot ack3+1)+\ldots\right)\mod\lfloor N_{ECCE,p,k}/L\rfloor\right\}+i$$

In the embodiment, M1 of the above formula has a value of $$\left\lceil\frac{b+9}{2}\right\rceil$$

and M2 has a value of $$\left\lceil\frac{b+1}{2}\right\rceil.$$

Since there is HARQ information transmitted, parameters K1 and K2 both have a value of 1. Thus, the formula for calculating EPDCCH resource positions is as follows.

$$L\left\{\left(Y_{p,k} + \left\lfloor \frac{m \cdot N_{ECCE,p,k}}{L \cdot M_p^{(L)}} \right\rfloor\right) + b + \right.$$

$$\left.\left(\left(\left\lceil \frac{b+9}{2} \right\rceil \cdot ack1 + 1\right) + \left(\left\lceil \frac{b+1}{2} \right\rceil \cdot ack2 + 1\right)\right)\right)$$

$$\text{mod}\lfloor N_{ECCE,p,k}/L \rfloor\right\} + i$$

Since the UE does not know a specific value of the HARQ information fed back by the base station, during demodulation, the UE needs to traverse all possible HARQ values so as to acquire a corresponding EPDCCH resource position.

4. The UE demodulates its EPDCCH information on the EPDCCH indicated by the corresponding EPDCCH resource position.

Each parameter in the formula is described as follows.

$i=0, \ldots, L-1$;

$N_{ECCE,p,k}$ is the number of ECCEs in an EPDCCH-PRB-set P, which can be acquired through table lookup;

if a higher layer is configured with CIF indication, $b=n_{CI}$; otherwise, $b=0$, where $n_{CI}$ is a value of CIF; $m=0, 1, \ldots M_p^{(L)}-1$, where $M_p^{(L)}$ is the number of EPDCCH candidates having an aggregation level L in the EPDCCH-PRB-set P; and $Y_{p,k}$ has a value $Y_{p,k}=(A \cdot Y_{p,k-1}) \mod D$, where $Y_{p,-1}=n_{RNTI}\neq 0$, $A=39827$ and $D=65537$, k is a serial number of a sub-frame in a wireless frame, $k=\lfloor n_s/2 \rfloor$, $n_s$ is a code of a slot in the wireless frame, and $n_{RNTI}$ is a terminal identifier configured to the UE by the higher layer.

Embodiment 4

When a base station side does not receive uplink data, there is no HARQ information transmitted. A specific operation process of the base station is as follows 1. The UE acquires EPDCCH-PRB-set information of the UE and a sub-frame serial number, determines a value of p, k, and acquires related information with respect to the UE required for transmitting EPDCCH information, such as the number of allocated PRBs, an aggregation level L, a CIF indication value nCI, $N_{CCE}$ value and the like. The EPDCCH herein can carry uplink authorization information of the UE and can also carry downlink authorization information of the UE.

2. The UE calculates its allocated EPDCCH resource positions according to the following formula:

$$L\left\{\left(Y_{p,k} + \left\lfloor \frac{m \cdot N_{ECCE,p,k}}{L \cdot M_p^{(L)}} \right\rfloor\right) + b + K_1 \cdot (M1 \cdot ack1 + 1) + K_2 \cdot (M2 \cdot ack2 + 1) + \right.$$

$$\left. K_3 \cdot (M3 \cdot ack3 + 1) + \ldots \right) \text{mod}\lfloor N_{ECCE,p,k}/L \rfloor\right\} + i$$

In the embodiment, since there is no HARQ information transmitted, parameters K1 and K2 both have a value of 0. Thus, the formula for calculating EPDCCH resource positions is as follows.

$$L\left\{\left(Y_{p,k} + \left\lfloor \frac{m \cdot N_{ECCE,p,k}}{L \cdot M_p^{(L)}} \right\rfloor\right) + b\right) \text{mod}\lfloor N_{ECCE,p,k}/L \rfloor\right\} + i$$

3. The base station transmits EPDCCH information of the UE. Specifically, the base station finds EPDCCH resources through determined EPDCCH resource positions, and transmits, using the EPDCCH resources, DCI information to the UE for the UE to obtain HARQ information.

At the UE side, steps for the UE to obtain the HARQ information are as follows.

1. The UE receives EPDCCH information transmitted from the base station.

2. The UE acquires related information required for receiving the EPDCCH information, such as the number of allocated PRBs of an EPDCCH-PRB-set, the aggregation level L, the CIF indication value nCI and the like. The EPDCCH herein can carry uplink authorization information of the UE and can also carry downlink authorization information of the UE.

3. The UE calculates its EPDCCH resource positions according to the following formula:

$$L\left\{\left(Y_{p,k} + \left\lfloor \frac{m \cdot N_{ECCE,p,k}}{L \cdot M_p^{(L)}} \right\rfloor\right) + b + K_1 \cdot (M1 \cdot ack1 + 1) + K_2 \cdot (M2 \cdot ack2 + 1) + \right.$$

$$\left. K_3 \cdot (M3 \cdot ack3 + 1) + \ldots \right) \text{mod}\lfloor N_{ECCE,p,k}/L \rfloor\right\} + i$$

In the embodiment, since there is no HARQ information transmitted, parameters K1 and K2 both have a value of 0, the formula for calculating EPDCCH resource positions is as follows.

$$L\left\{\left(Y_{p,k} + \left\lfloor \frac{m \cdot N_{ECCE,p,k}}{L \cdot M_p^{(L)}} \right\rfloor\right) + b\right) \text{mod}\lfloor N_{ECCE,p,k}/L \rfloor\right\} + i$$

It can be seen from the above formula that the method for allocating EPDCCH resource positions is compatible with the allocation method in the existing LTE techniques.

4. The UE demodulates its EPDCCH information on EPDCCH resources indicated by the corresponding EPDCCH resource position.

Each parameter in the formula is described as follows.

$i=0, \ldots, L-1$;

$N_{ECCE,p,k}$ is the number of ECCEs in an EPDCCH-PRB-set P, which can beacquired through table lookup;

if a higher layer is configured with CIF indication, $b=n_{CI}$; otherwise, $b=0$, where $n_{CI}$ is a value of CIF; $m=0, 1, \ldots M_p^{(L)}-1$, where $N_p^{(L)}$ is the number of EPDCCH candidates having an aggregation level L in the EPDCCH-PRB-set P;

$Y_{p,k}$ has a value $Y_{p,k}=(A \cdot Y_{p,k-1}) \mod D$, where $Y_{p,-1}=n_{RNTI}\neq 0$, $A=39827$ and $D=65537$, k is a serial number of a sub-frame in a wireless frame, $k=\lfloor n_s/2 \rfloor$, II, $n_s$ is a code of a slot in the wireless frame, and $n_{RNTI}$ is an RNTI representing the terminal identifier configured to the UE by the higher layer.

K1, K2, K3, . . . are ack-transmitting-enabling switches of related data blocks. These enabling switches can be configured semi-statically by the higher layer and can also be configured dynamically through control signaling. Time sequence relationship can be used to determine their enabling, and it is possible to not configure these enabling switches. When they are configured, the calculation amount detected by the UE side will reduce; otherwise, the calculation amount detected by the UE will increase.

Preconditions for values of M1, M2, M3 . . . include that: with the same aggregation level L, it should be ensured that the PDCCH/EPDCCH resource positions of UE carrying HARQ information do not overlap with PDCCH/EPDCCH resource positions not carrying HARQ information, and at the same time the PDCCH/EPDCCH resource positions of the UE carrying different HARQ information do not overlap from each other so as to guarantee accurate delivery of HARQ information.

Information of M1, M2, M3 . . . can be configured by the higher layer to the base station side and the UE side, and can also be specified in a standard manner. For example, a database is established within which data are written into and cannot be modified any more.

Figure 4:
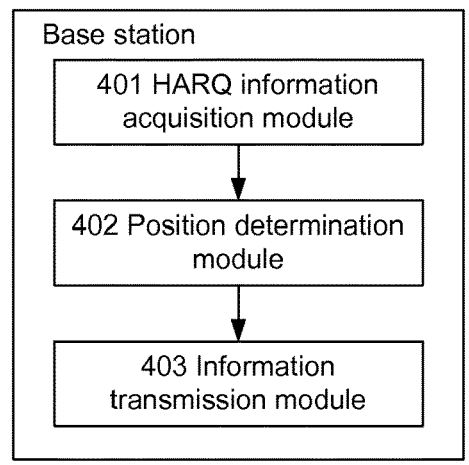
FIG. 4 is a schematic structural diagram of a base station according to an embodiment of the disclosure.

FIG. 4 is a schematic structural diagram of a base station according to an embodiment of the disclosure. As shown in FIG. 4, the base station includes an HARQ information acquisition module 401, a position determination module 402 and an information transmission module 403.

The HARQ information acquisition module 401 is configured to receive uplink data of a UE, and obtain HARQ information of the uplink data by performing reception processing on the uplink data.

The position determination module 402 is configured to determine, using the HARQ information and related information for transmitting downlink control information, a control channel resource position corresponding to the HARQ information.

The information transmission module 403 is configured to transmit, using resources of a control channel indicated by the control channel resource position, the downlink control information to the UE so that the UE acquires the HARQ information.

The HARQ information acquisition module 401, the position determination module 402 and the information transmission module 403 can be implemented by a Central Processing Unit (CPU), a Digital Signal Processor (DSP) or a Field Programmable Gate Array (FPGA) of the base station.

Figure 5:
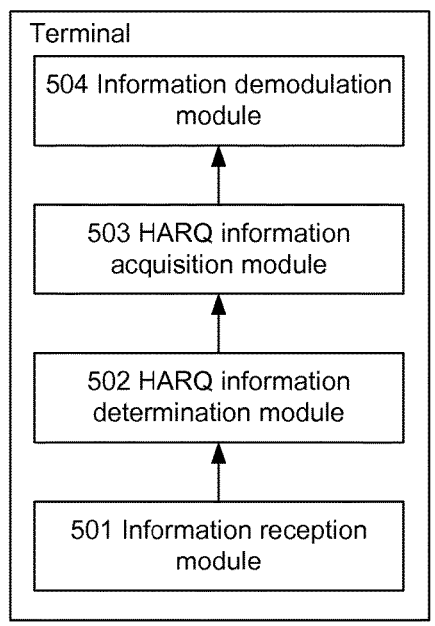
FIG. 5 is a schematic diagram of a terminal according to an embodiment of the disclosure.

FIG. 5 shows a schematic structural diagram of a terminal according to an embodiment of the disclosure. As shown in FIG. 5, the terminal includes:

an information reception module 501, an HARQ information determination module 502 and an HARQ information acquisition module 503.

The information reception module 501 is configured to receive downlink control information from a base station through a control channel.

The HARQ information determination module 502 is configured to determine whether there is HARQ information transmitted by using information of a current sub-frame for transmitting the downlink control information.

The HARQ information acquisition module 503 is configured to, when it is determined that there is HARQ information transmitted, obtain the HARQ information by determining a control channel resource position used by the downlink control information.

Preferably, the terminal may further include an information demodulation module 504 configured to find resources of the control channel via the control channel resource position, and demodulate the downlink control information of the UE by using the resources of the control channel, wherein the control channel is a PDCCH or EPDCCH.

The information reception module 501, the HARQ information determination module 502, the HARQ information acquisition module 503 and the information demodulation module 504 can be implemented by a CPU, DSP or RPGA of the terminal.

Figure 6:
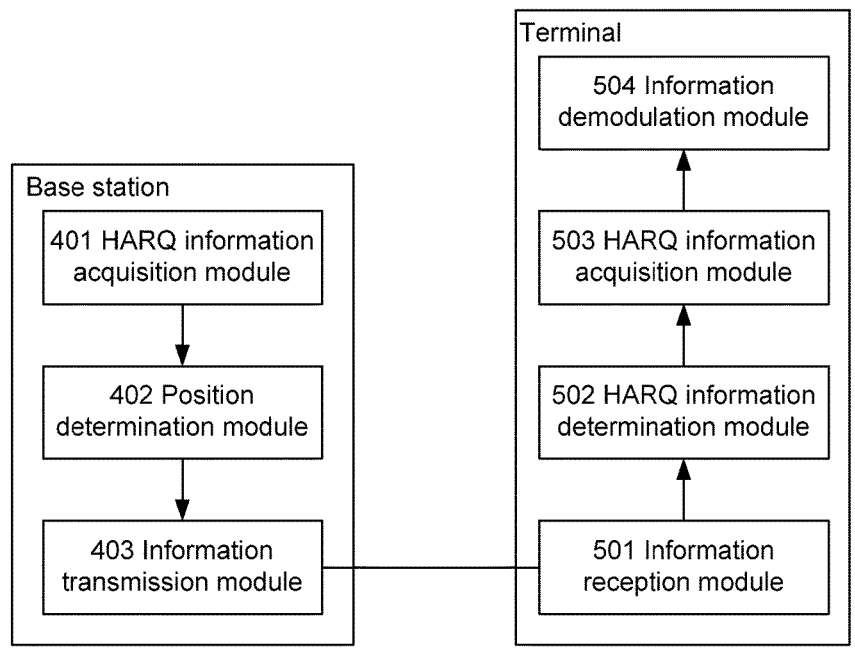
FIG. 6 is a schematic diagram of a system for transmitting HARQ information according to an embodiment of the disclosure.

FIG. 6 shows a schematic structural diagram of a system for transmitting HARQ information according to an embodiment of the disclosure. As shown in FIG. 6, the system includes the above base station and the above terminal.

To sum up, in the embodiments of the disclosure, the HARQ information is combined with allocation of PDCCH/EPDCCH resource positions, and both the HARQ information and PDCCH/EPDCCH information are transmitted without influences on the number of resources occupied by the PDCCH/EPDCCH while time frequency resources are saved.

It should be appreciated by those skilled in the art that embodiments of the disclosure can be provided as a method, system or computer program product. Therefore, the disclosure can be implemented in the form of hardware, software or a combination thereof. In addition, the disclosure can be implemented in the form of a computer program product implemented on one or more computer usable storage media (including but not limiting to a magnetic disk storage and an optical storage) containing computer usable program codes.

The disclosure is described with reference to flow charts and/or block diagrams of the method, device (system) and computer program product according to embodiments of the disclosure. It should be appreciated that computer program instructions can be used to implement each process and/or block in flow charts and/or block diagrams and to implement the combination of processes and/or blocks in the flow charts and/or the block diagrams. Such computer program instructions can be provided to a processor of a general-purpose computer, a special-purpose computer, an embedded processor or other programmable data processing device so as to form a machine so that an instruction implemented by the processor of the computer or other programmable data processing device generates a device for implementing a function specified in one or more processes of a flow chart and/or one or more blocks of a block diagram.

Such computer program instructions can also be stored in a computer readable storage capable of directing a computer or other programmable data processing devices to operate in a specific way so that an instruction stored in the computer readable storage generates an article including an instructing device which can implement a function specified in one or more processes of a flow chart and/or one or more blocks of a block diagram.

Such computer program instructions can also be loaded onto a computer or other programmable data processing device so that a series of operation steps are implemented on the computer or other programmable data processing device to generate a computer-implemented processing and therefore an instruction implemented on the computer or other programmable devices provides a step for implementing a function specified in one or more processes of a flow chart and/or one or more blocks of a block diagram.

Although the disclosure is elaborated herein, the disclosure is not limited to the above description, and those skilled in the art can make various modifications according to the principle of the disclosure. Therefore, it will be appreciated that modifications made in accordance with the principle of the disclosure should fall within the scope of protection of the disclosure.

The invention claimed is:

1. A method for transmitting Hybrid Automatic Repeat Request (HARQ) information, comprising:

receiving, by a base station, uplink data of a User Equipment (UE), and obtaining HARQ information of the uplink data, wherein the step of receiving, by the base station, the uplink data of the UE and obtaining the HARQ information of the uplink data comprises:
    obtaining, by the base station, the HARQ information of the uplink data by performing reception processing on the uplink data, wherein the HARQ information comprises an ACK/NACK value for indicating a result of the reception processing on the uplink data;
enabling combination of the HARQ information into allocation of a control channel resource position by using related information for transmitting downlink control information; and
transmitting, by using resources of a control channel indicated by the control channel resource position, the downlink control information to the UE so that the UE acquires the HARQ information by determining a control channel resource position used in the downlink control information;
wherein when the control channel is a Physical Downlink Control Channel (PDCCH), the related information for transmitting the downlink control information comprises an aggregation level and a Carrier Indicator Field (CIF) indication value; and
the step of enabling combination of the HARQ information into allocation of the control channel resource position by using related information for transmitting downlink control information comprises:
    determining, by the base station, a PDCCH resource position of the UE by using the ACK/NACK value, the aggregation level and the CIF indication value, wherein the PDCCH resource position of the UE corresponds to the ACK/NACK value;
or,
wherein when the control channel is an Enhanced Physical Downlink Control Channel (EPDCCH), the related information for transmitting the downlink control information comprises the number of allocated Physical Resource Blocks (PRBs) in a PRB set of the EPDCCH, an aggregation level and a Carrier Indicator Field (CIF) indication value; and
the step of enabling combination of the HARQ information into allocation of the control channel resource position by using related information for transmitting downlink control information comprises:
    determining, by the base station, an EPDCCH resource position of the UE by using the ACK/NACK value, the number of allocated PRBs, the aggregation level and the CIF indication value, wherein the EPDCCH resource position of the UE corresponds to the ACK/NACK value.

2. The method according to claim 1, wherein the step where the UE acquires the HARQ information by determining the control channel resource position used in the downlink control information comprises:
    receiving, by the UE, the downlink control information from the base station through the control channel;
    determining, by using information of a current sub-frame for transmitting the downlink control information, whether there is HARQ information transmitted; and
    when it is determined that there is HARQ information transmitted, obtaining the HARQ information by determining the control channel resource position used in the downlink control information.

3. The method according to claim 1, wherein the step of determining the control channel resource position comprises:
    when the control channel is the PDCCH, determining, by the UE, the PDCCH resource position of the UE by using related information for receiving the downlink control information through traversal of the ACK/NACK value of the uplink data, wherein the related information contains the aggregation level and the CIF indication value.

4. The method according to claim 3, further comprising:
    finding, by the UE, PDCCH resources via the PDCCH resource position, and demodulating the downlink control information of the UE by the PDCCH resources.

5. The method according to claim 4, wherein the step where the UE acquires the HARQ information by determining the control channel resource position used in the downlink control information comprises:
    receiving, by the UE, the downlink control information from the base station through the control channel;
    determining, by using information of a current sub-frame for transmitting the downlink control information, whether there is HARQ information transmitted; and
    when it is determined that there is HARQ information transmitted, obtaining the HARQ information by determining the control channel resource position used in the downlink control information.

6. The method according to claim 3, wherein the step where the UE acquires the HARQ information by determining the control channel resource position used in the downlink control information comprises:
    receiving, by the UE, the downlink control information from the base station through the control channel;
    determining, by using information of a current sub-frame for transmitting the downlink control information, whether there is HARQ information transmitted; and
    when it is determined that there is HARQ information transmitted, obtaining the HARQ information by determining the control channel resource position used in the downlink control information.

7. The method according to claim 1, wherein the step of determining the control channel resource position comprises:
    when the control channel is the EPDCCH, determining, by the UE, the EPDCCH resource position of the UE by using related information for receiving the downlink control information through traversal of the ACK/NACK value of the uplink data, wherein the related information contains the number of allocated PRBs, the aggregation level and the CIF indication value.

8. The method according to claim 7, wherein the step where the UE acquires the HARQ information by determining the control channel resource position used in the downlink control information comprises:
    receiving, by the UE, the downlink control information from the base station through the control channel;
    determining, by using information of a current sub-frame for transmitting the downlink control information, whether there is HARQ information transmitted; and
    when it is determined that there is HARQ information transmitted, obtaining the HARQ information by determining the control channel resource position used in the downlink control information.

9. The method according to claim 7, further comprising: finding, by the UE, EPDCCH resources via the EPDCCH resource position, and demodulating the downlink control information of the UE by the EPDCCH resources.

10. A base station, comprising a processor and a memory, wherein the memory coupled to the processor for storing computer readable program, which when executed by the processor causes the processor to:

receive uplink data of a User Equipment (UE) and obtain Hybrid Automatic Repeat Request (HARQ) information of the uplink data by performing reception processing on the uplink data, wherein the HARQ information comprises an ACK/NACK value for indicating a result of the reception processing on the uplink data;

enable combination of the HARQ information into allocation of a control channel resource position by using related information for transmitting downlink control information; and transmit, by using resources of a control channel indicated by the control channel resource position, the downlink control information to the UE so that the UE acquires the HARQ information by determining a control channel resource position used in the downlink control information, wherein when the control channel is a Physical Downlink Control Channel (PDCCH):

the related information for transmitting the downlink control information comprises an aggregation level and a Carrier Indicator Field (CIF) indication value; and the processor is further configured to determine a PDCCH resource position of the UE by using the ACK/NACK value, the aggregation level and the CIF indication value, wherein the PDCCH resource position of the UE corresponds to the ACK/NACK value;

or, wherein when the control channel is an Enhanced Physical Downlink Control Channel (EPDCCH):

the related information for transmitting the downlink control information comprises the number of allocated Physical Resource Blocks (PRBs) in a PRB set of the EPDCCH, an aggregation level and a Carrier Indicator Field (CIF) indication value; and the processor is further configured to determine an EPDCCH resource position of the UE by using the ACK/NACK value, the number of allocated PRBs, the aggregation level and the CIF indication value, wherein the EPDCCH resource position of the UE corresponds to the ACK/NACK value.

11. A terminal, comprising a processor and a memory, wherein the memory coupled to the processor for storing computer readable program, which when executed by the processor causes the processor to:

receive downlink control information from a base station through a control channel;

determine whether there is Hybrid Automatic Repeat Request (HARQ) information transmitted by using information of a current sub-frame for transmitting the downlink control information; and obtain the HARQ information by determining a control channel resource position used in the downlink control information, when it is determined that there is HARQ information transmitted, wherein the HARQ information comprises an ACK/NACK value for indicating a result of reception processing on uplink data received by the base station, wherein when the control channel is a Physical Downlink Control Channel (PDCCH), related information for transmitting the downlink control information comprises an aggregation level and a Carrier Indicator Field (CIF) indication value; and the HARQ information is combined into allocation of the control channel resource position by using the related information for transmitting downlink control information by determining a PDCCH resource position of the UE by using the ACK/NACK value, the aggregation level and the CIF indication value, wherein the PDCCH resource position of the UE corresponds to the ACK/NACK value;

or, wherein when the control channel is an Enhanced Physical Downlink Control Channel (EPDCCH), the related information for transmitting the downlink control information comprises the number of allocated Physical Resource Blocks (PRBs) in a PRB set of the EPDCCH, an aggregation level and a Carrier Indicator Field (CIF) indication value; and the HARQ information is combined into allocation of the control channel resource position by using related information for transmitting downlink control information by determining an EPDCCH resource position of the UE by using the ACK/NACK value, the number of allocated PRBs, the aggregation level and the CIF indication value, wherein the EPDCCH resource position of the UE corresponds to the ACK/NACK value.

12. The terminal according to claim 11, the processor is further configured to:

find resources of the control channel via the control channel resource position, and demodulate the downlink control information of a User Equipment (UE) by using the resources of the control channel.

13. A computer readable storage medium, comprising a set of instructions that, when executed, cause at least one processor to perform the following operations of:

receiving uplink data of a User Equipment (UE), and obtaining Hybrid Automatic Repeat Request (HARQ) information of the uplink data, wherein the step of receiving the uplink data of the UE and obtaining the HARQ information of the uplink data comprises:

obtaining the HARQ information of the uplink data by performing reception processing on the uplink data, wherein the HARQ information comprises an ACK/NACK value for indicating a result of the reception processing on the uplink data;

enabling combination of the HARQ information into allocation of a control channel resource position by using related information for transmitting downlink control information; and transmitting, by using resources of a control channel indicated by the control channel resource position, the downlink control information to the UE so that the UE acquires the HARQ information by determining a control channel resource position used in the downlink control information;

wherein when the control channel is a Physical Downlink Control Channel (PDCCH), the related information for transmitting the downlink control information comprises an aggregation level and a Carrier Indicator Field (CIF) indication value; and the step of enabling combination of the HARQ information into allocation of the control channel resource position by using related information for transmitting downlink control information comprises:

determining a PDCCH resource position of the UE by using the ACK/NACK value, the aggregation level and the CIF indication value, wherein the PDCCH resource position of the UE corresponds to the ACK/NACK value;

or, wherein when the control channel is an Enhanced Physical Downlink Control Channel (EPDCCH), the related information for transmitting the downlink control information comprises the number of allocated Physical Resource Blocks (PRBs) in a PRB set of the EPDCCH, an aggregation level and a Carrier Indicator Field (CIF) indication value; and the step of enabling combination of the HARQ information into allocation of the control channel resource position by using related information for transmitting downlink control information comprises:

determining an EPDCCH resource position of the UE by using the ACK/NACK value, the number of allocated PRBs, the aggregation level and the CIF indication value, wherein the EPDCCH resource position of the UE corresponds to the ACK/NACK value.

* * * * *